(12) United States Patent
Koyama (10) Patent No.: US 11,543,004 B2
(45) Date of Patent: Jan. 3, 2023

(54) CHAIN DRIVE SYSTEM

(71) Applicant: TSUBAKIMOTO CHAIN CO., Osaka (JP)

(72) Inventor: Masahiro Koyama, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 85 days.

(21) Appl. No.: 17/021,219

(22) Filed: Sep. 15, 2020

(65) Prior Publication Data
US 2021/0079983 A1 Mar. 18, 2021

(30) Foreign Application Priority Data
Sep. 18, 2019 (JP) .............................. JP2019-169064

(51) Int. Cl.
*F16H 7/18* (2006.01)
*F16H 7/08* (2006.01)
*F16G 13/02* (2006.01)

(52) U.S. Cl.
CPC ............... *F16H 7/18* (2013.01); *F16G 13/02* (2013.01); *F16H 7/08* (2013.01); *F16H 2007/0872* (2013.01); *F16H 2007/185* (2013.01)

(58) Field of Classification Search
CPC ...... F16H 7/06; F16H 7/08; F16H 2007/0863; F16H 2007/0872; F16H 7/18; F16H 2007/185; F16H 2007/0893; F16H 9/00; F16H 9/24; F16G 1/00; F16G 1/24; F16G 1/28; F16G 5/00; F16G 5/163; F16G 5/18; F16G 5/20; F16G 13/00; F16G 13/02; F16G 13/06; F16G 13/07; F16G 13/08
See application file for complete search history.

(56) References Cited

U.S. PATENT DOCUMENTS 5,809,767 A * 9/1998 Tanaka .................... F16G 13/06
 59/5
6,220,981 B1 * 4/2001 Yoshida .................. F16G 13/06
 474/212

(Continued)

FOREIGN PATENT DOCUMENTS

DE 202012007568 U1 * 10/2012 ............. F16G 13/02
JP 2000-266141 A 9/2000

OTHER PUBLICATIONS

Molybdenum Disulfide; Wikipedia; Last Edited: Apr. 20, 2019; Published: Jun. 6, 2019; Published By: Waybackmachine; https://web.archive.org/web/20190606090849/https://en.wikipedia.org/wiki/Molybdenum_disulfide (Year: 2019).*

*Primary Examiner* — Michael R Mansen
*Assistant Examiner* — Raveen J Dias
(74) *Attorney, Agent, or Firm* — WHDA, LLP (57) ABSTRACT

An object of the present invention is to provide a chain drive system capable of reducing sliding resistance between a chain and a guide shoe, suppressing an increase, over time, in sliding resistance, and reducing wear on the guide shoe. A chain drive system according to the present invention includes a chain having a plurality of chain plates, a plurality of sprockets on which the chain is wound, and one or more guides each including, integrally or separately, a guide shoe having a chain-running surface, and slidably guiding, in presence of lubricating oil, the chain. At least one of the plurality of chain plates has a lubricant region retaining a solid lubricant.

6 Claims, 6 Drawing Sheets

(56) References Cited

U.S. PATENT DOCUMENTS

| | | | |
|---|---|---|---|
| 6,364,800 B1 * | 4/2002 | Avramidis | F16G 13/04 474/213 |
| 6,969,560 B2 * | 11/2005 | Nagai | F16G 13/04 428/697 |
| 7,585,239 B2 * | 9/2009 | Miyazawa | F16G 13/06 474/155 |
| 10,400,857 B2 * | 9/2019 | Park | F16G 13/08 |
| D897,907 S * | 10/2020 | Wu | D12/124 |
| 2008/0020882 A1 * | 1/2008 | Tohara | F16G 13/06 474/212 |
| 2009/0017951 A1 * | 1/2009 | Tohara | F16G 13/04 474/231 |
| 2009/0042683 A1 * | 2/2009 | Tohara | F16G 13/08 474/213 |
| 2009/0111626 A1 * | 4/2009 | Tohara | F16H 57/05 474/91 |
| 2009/0286642 A1 * | 11/2009 | Takagishi | F16G 13/06 474/231 |
| 2010/0248879 A1 * | 9/2010 | Tanaka | C10M 169/02 474/206 |
| 2011/0183800 A1 * | 7/2011 | Tohara | F16G 13/02 474/206 |
| 2012/0129636 A1 * | 5/2012 | Lee | F16H 7/18 474/111 |
| 2013/0196804 A1 * | 8/2013 | Bodensteiner | F16H 7/06 474/148 |
| 2014/0057749 A1 * | 2/2014 | Konno | F16H 7/08 474/111 |
| 2015/0093595 A1 * | 4/2015 | Asakawa | B32B 15/00 428/656 |
| 2015/0204218 A1 * | 7/2015 | Utaki | F01M 9/10 474/140 |
| 2015/0204437 A1 * | 7/2015 | Utaki | F16H 57/05 474/91 |
| 2016/0137948 A1 * | 5/2016 | Yoshii | C10M 169/00 508/308 |
| 2016/0223053 A1 * | 8/2016 | Rampp | F16G 13/06 |
| 2017/0211660 A1 * | 7/2017 | Yasu | F16G 15/06 |
| 2017/0234403 A1 * | 8/2017 | Sano | F16G 13/06 474/228 |
| 2017/0248205 A1 * | 8/2017 | Moster | F16H 7/08 |
| 2018/0038476 A1 * | 2/2018 | Konno | F16H 57/05 |
| 2018/0223969 A1 * | 8/2018 | Konno | F16H 7/18 |
| 2018/0223985 A1 * | 8/2018 | Konno | F16H 7/18 |
| 2018/0252301 A1 * | 9/2018 | Konno | F16H 57/05 |

\* cited by examiner

RELATED ART

Fig. 11

RELATED ART

CHAIN DRIVE SYSTEM

BACKGROUND OF THE INVENTION

1. Field of the Invention

The present invention relates to a chain drive system including a chain having a plurality of chain plates, a plurality of sprockets on which the chain is wound, and one or more guides slidably guiding the chain, the guide including, integrally or separately, a guide shoe having a chain-running surface.

2. Description of the Related Art

A chain drive system having a guide that guides a running chain, with the guide having, integrally or separately, a guide shoe that slidably guides the chain, has been commonly used for stabilizing the chain that runs between sprockets and for maintaining a correct tension.

For example, for a chain drive system used in a timing system of an internal combustion engine such as an automobile, reduction of sliding resistance between the chain and the guide shoe and reduction of wear on the guide shoe are both desired from the viewpoints of noise suppression and power loss reduction. In view of such circumstances, various measures have been taken such as improvements in the shapes and materials of the chain and guide shoe, application of surface treatments, and so on, presupposing that the chain is made of metal while the guide shoe is made of resin, that lubricating oil is supplied between the chain and the guide shoe during use, and that the system is used in a high temperature environment.

However, changing the shapes of the chain and guide shoe, for example, so as to reduce sliding resistance between the chain and the guide shoe, leads to a reduction in a contact area between the chain and the guide shoe, and inevitably results in increased wear on the guide shoe in a high tension environment and the like.

On the other hand, changing the shapes of the chain and guide shoe so as to reduce wear on the guide shoe leads to a larger contact area between the chain and the guide shoe, and results in increased sliding resistance between the chain and the guide shoe.

These trade-offs, i.e., reduction of the sliding resistance between the chain and the guide shoe and reduction of the wear on the guide shoe, have been difficult to solve simply through design changes of the chain and guide shoe.

Another measure that has been proposed is to preliminarily perform a surface treatment that elicits a wear reduction effect for the guide shoe on the chain-running surface of the guide shoe (see Japanese Patent Application Laid-open No. 2000-266141).

Figure 10:
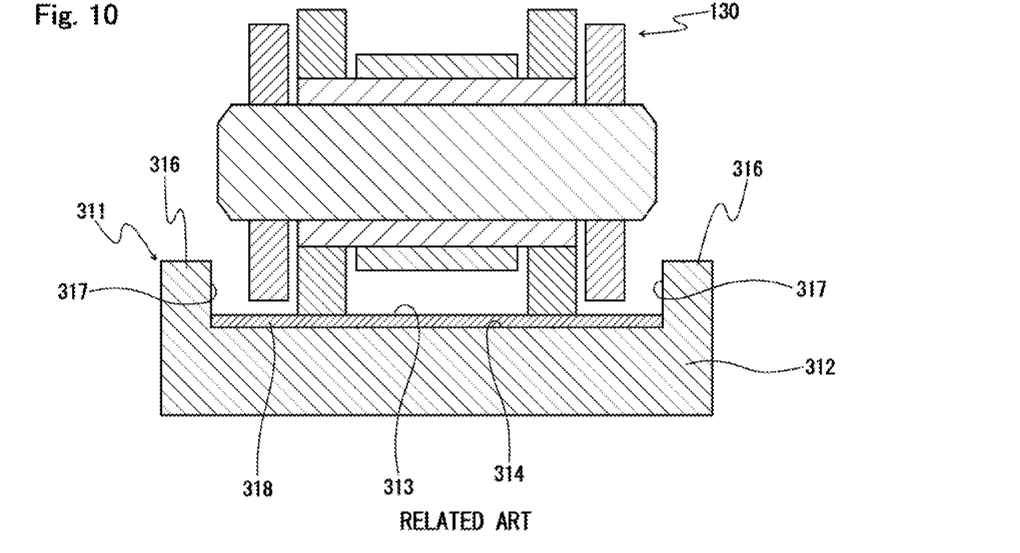
FIG. 10 is a schematic cross-sectional view illustrating a state of contact between the chain and the guide shoe according to an existing chain drive system.

Japanese Patent Application Laid-open No. 2000-266141 describes a configuration of a chain-running surface 313 wherein a thermal spray coating film 318 of a ceramics material is formed on a surface 314 of a shoe body part 312 that is made of synthetic resin, as illustrated in FIG. 10.

SUMMARY OF THE INVENTION

As indicated in Japanese Patent Application Laid-open No. 2000-266141, it is assumed that the surface treatment on the chain-running surface 313 of the guide shoe 311 reduces initial wear. However, the thermal spray coating film 318 wears off, as time passes, by the sliding movement of the chain 130 and guide shoe 311, and moreover, powder generated by abrasion of the thermal spray coating film 318 is swiftly removed by the lubricating oil, hence consistent wear reduction effect and sliding resistance reduction effect are not expected.

Figure 11:
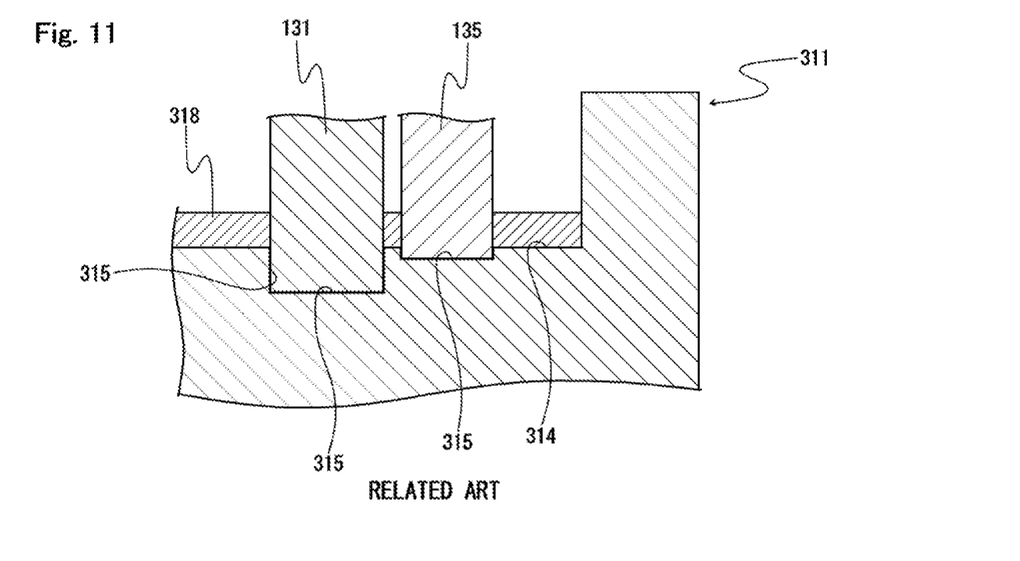
FIG. 11 is a schematic cross-sectional view illustrating a state of contact between the chain and the guide shoe of the fixed guide when the guide shoe has worn.

Moreover, according to Japanese Patent Application Laid-open No. 2000-266141, the sliding resistance reduction effect and wear reduction effect are achieved only on the surface of the shoe body part 312 provided with the surface treatment. As illustrated in FIG. 11, for example, the metal chain 130 makes sliding contact with resin parts of the guide shoe 311 on an exposed surface 314 of the shoe body part 312, where the thermal spray coating film 318 has worn off due to the sliding movement of the inner link plates 131, and outer link plates 135 of the chain 130 and the guide shoe 311, or on wall surfaces 315 that are newly formed on the shoe body part 312 due to further wear and that allow the chain 130 to come into sliding contact therewith. Hence, the sliding resistance reduction effect and wear reduction effect cannot be achieved. Furthermore, the metal chain 130 makes sliding contact with resin parts of the guide shoe 311 also on side faces 317 on the chain-running surface 313 side of guide wall parts 316 that are provided in end portions in the width direction of the chain-running surface 313. Hence, the sliding resistance reduction effect and wear reduction effect cannot be achieved.

The present invention solves the issues in known chain drive systems, and an object thereof is to provide a chain drive system capable of reducing sliding resistance between a chain and a guide shoe, suppressing an increase, over time, in sliding resistance, and reducing wear on the guide shoe.

The present invention solves the issues described above by providing a chain drive system including a chain including a plurality of chain plates, a plurality of sprockets on which the chain is wound, and one or more guides slidably guiding, in presence of lubricating oil, the chain, the guide including, integrally or separately, a guide shoe having a chain-running surface, wherein at least one of the plurality of chain plates has a lubricant region retaining a solid lubricant.

According to the chain drive system set forth in claim 1, the sliding movement of the chain and guide shoe causes the solid lubricant that comes off of the surface of the lubricant region of the chain plates to adhere to and to be retained on regions of the guide shoe making sliding contact with the chain, whereby the lubrication effect of the solid lubricant itself can be achieved for the regions including the chain-running surface and making sliding contact with the chain. Since the solid lubricant comes off of the surface of the lubricant region of the chain plates little by little by the sliding movement of the chain and guide shoe, the solid lubricant can be constantly supplied to the guide shoe. Accordingly, the sliding resistance between the chain and the guide shoe can be largely reduced, an increase, over time, in sliding resistance can be suppressed, and wear on the guide shoe can be reduced.

Moreover, even in conditions with high contact surface pressure, where guide shoes may suffer increased wear, in chain drive systems in the prior art, the wear on the guide shoe can be reduced according to the chain drive system set forth in claim 1. This enables the chain and guide shoe to be designed to have a smaller contact area between the chain plates and the guide shoe, thereby reducing sliding resistance between the chain and the guide shoe, and leading to higher degree of design freedom.

According to the configuration set forth in claim 2, the solid lubricant can be reliably retained so as to be embedded in the guide shoe that is normally made of resin. Moreover, the sliding movement of the chain and guide shoe can facilitate formation of a tribofilm, deriving from additive components of the lubricating oil, in the regions where the solid lubricant is retained and where the chain makes sliding contact. Accordingly, the intended lubrication effect of the solid lubricant is reliably achieved while the lubrication effect is achieved by the tribofilm, whereby the effect of reducing sliding resistance and the effect of reducing wear are elicited even more reliably.

According to the configuration set forth in claim 3, the solid lubricant can reliably be transferred to regions that make sliding contact with the chain on the chain-running surface by the sliding movement of the chain and guide shoe.

According to the configurations set forth in claims 4 to 6, the sliding movement of the chain and guide shoe can cause the solid lubricant to transfer to even wall surfaces that may newly be formed on the guide shoe by wear, or surfaces on the chain-running surface side of guide walls that are provided in end portions in a width direction of the chain-running surface. Therefore, the chain that is usually made of metal and the guide shoe that is usually made of resin can avoid making direct sliding contact with each other, whereby an increase in sliding resistance can be effectively prevented.

DESCRIPTION OF THE PREFERRED EMBODIMENTS

Embodiments

A chain drive system according to an embodiment of the present invention will be described with reference to the drawings.

Figure 1:
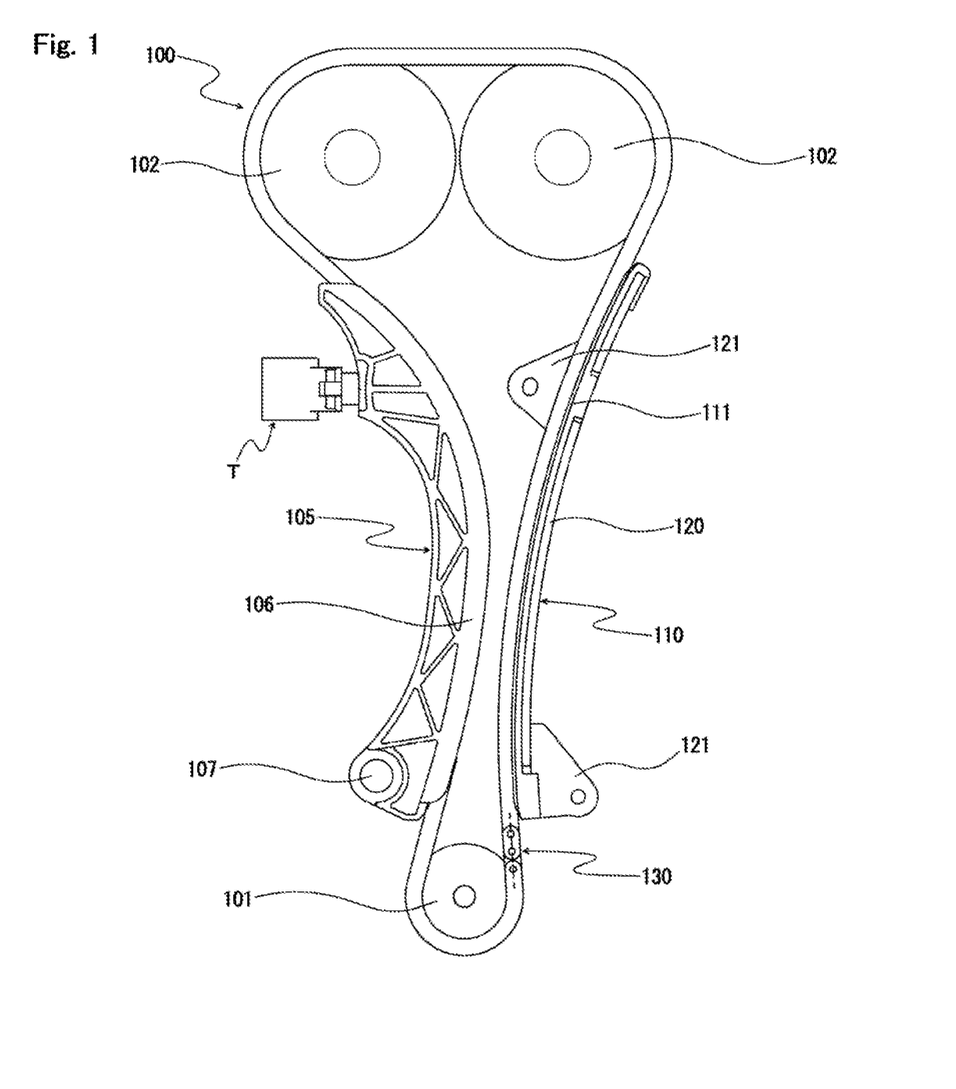
FIG. 1 is an overall view of a chain drive system according to one embodiment of the present invention.

The chain drive system 100 is applied to a timing system of a car engine. As illustrated in FIG. 1, a chain 130 is wound on a drive sprocket 101 provided to a crankshaft and two driven sprockets 102 each provided to each of the two cam shafts. A pivoting lever guide 105 and a fixed guide 110 guide the chain 130 running between the drive sprocket 101 and the driven sprockets 102.

The pivoting lever guide 105 is made of a synthetic resin material and formed by injection molding, for example. A guide shoe 106 that slidably guides the running chain 130 in presence of lubricating oil is provided integrally to the pivoting lever guide. The guide shoe 106 has a chain-running surface extending along a chain-running direction.

The pivoting lever guide 105 has a pivot shaft part 107 pivotably attached to the engine on the side closer to the drive sprocket 101. A tensioner T provided on the side closer to the driven sprockets 102 presses the guide against the chain 130 to apply a predetermined tension to the chain 130.

The fixed guide 110 includes a guide shoe 111 slidably guiding the running chain 130 in presence of lubricating oil and a base member 120 that supports the guide shoe 111 along the chain-running direction. The base member 120 has an attachment part 121 for securing the base member to an engine block (not shown) that is the object to which the base member is mounted.

Figure 2:
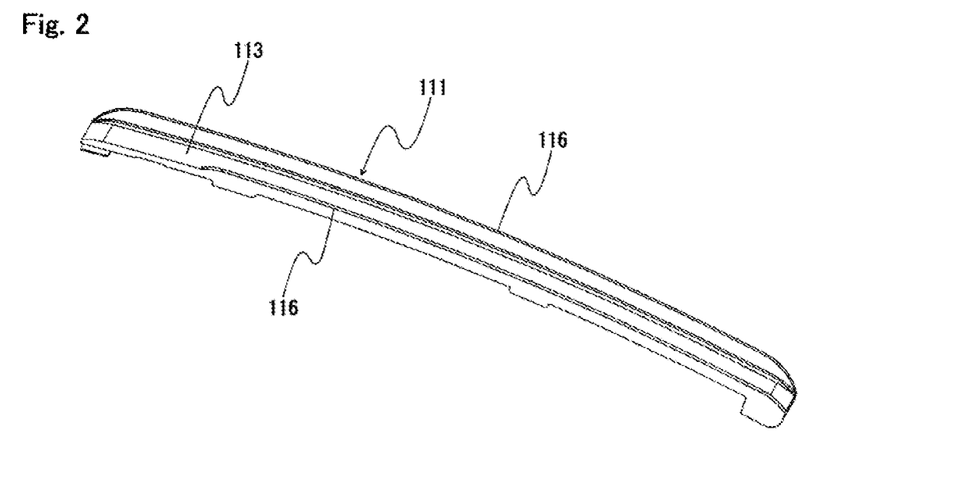
FIG. 2 is a perspective view illustrating an outer view of a guide shoe according to one embodiment of the present invention.

The guide shoe 111 is made of a synthetic resin material and formed by injection molding, for example. As illustrated in FIG. 2, the guide shoe has a chain-running surface 113 extending along the chain-running direction on the side facing the engine room. On both outer sides in the shoe width direction of the chain-running surface 113 are guide walls 116, one each on each side.

The base member 120 is made of a metal material and formed by punching, bending, and so on from a metal plate, for example.

The chain 130 in this embodiment is configured as a roller chain, for example, but the chain may be any type of chain, such as bushing chain or silent chain, as long as it has chain plates slidably guided by the guide shoes 106 and 111.

Figure 3:
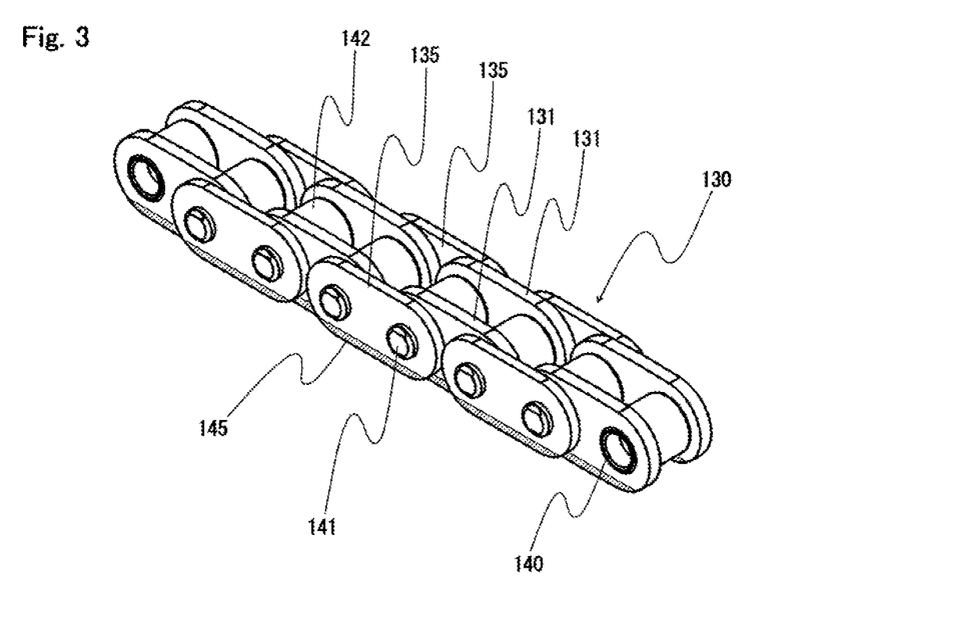
FIG. 3 is a perspective view illustrating part of the chain according to one embodiment of the present invention.
Figure 4:
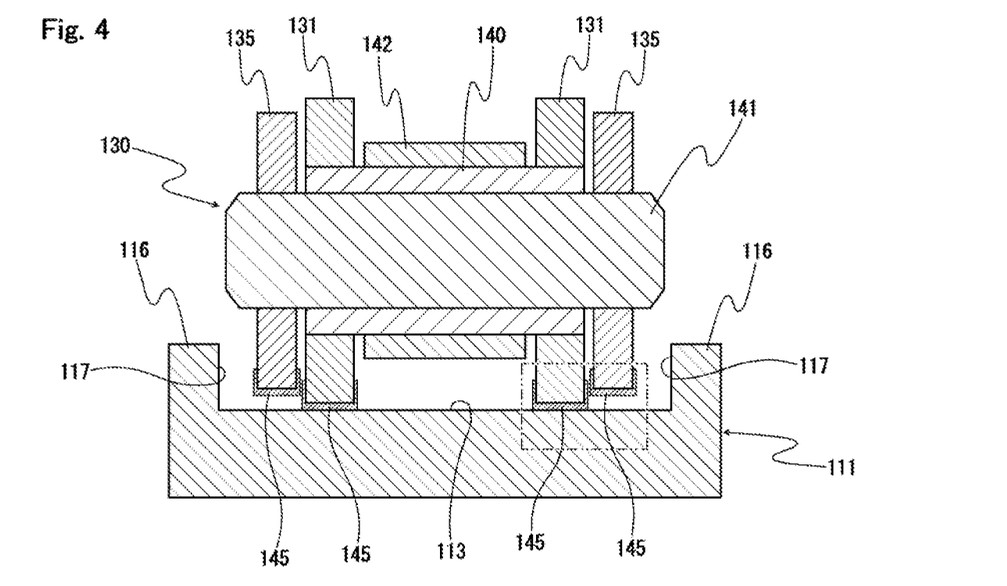
FIG. 4 is a schematic cross-sectional view illustrating a state of contact between the chain and the guide shoe of a fixed guide according to one embodiment of the present invention.

As illustrated in FIG. 3 and FIG. 4, the chain 130 includes a plurality of inner links having left and right inner link plates 131 with bushing holes for fixedly holding both ends of front and rear cylindrical bushings 140, a plurality of outer links having left and right outer link plates 135 with pin holes for fixedly holding both ends of front and rear connecting pins 141, and rollers 142 fitted on the bushings 140. These plurality of inner links and plurality of outer links are alternately connected to each other along the longitudinal direction of the chain by inserting the connecting pins 141 in the bushings 140. While the inner link plate 131 is formed larger than the outer link plate 135 in this embodiment, the inner and outer link plates may be formed in the same size. Hereinafter the inner link plates 131 and outer link plates 135 are collectively referred to as chain plates.

In the chain drive system 100 according to this embodiment, all the chain plates have a lubricant region 145 where a solid lubricant is retained.

Figure 5:
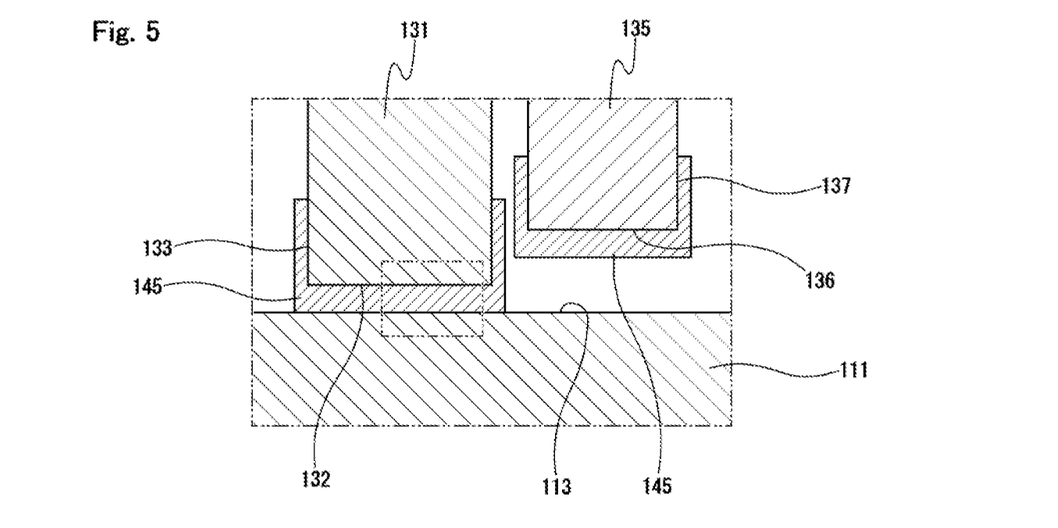
FIG. 5 is an enlarged view illustrating a region encircled with a two-dot chain line in FIG. 4.

The inner link plate 131 is provided with a lubricant region 145 on a sliding contact end face 132 that makes sliding contact with the chain-running surface 113 of the guide shoe 111 and on a side face 133 that may come into sliding contact with the guide shoe 111 in the width direction, as also illustrated in FIG. 5.

The outer link plate 135 is provided with a lubricant region 145 on an end face 136 that faces the chain-running surface 113 of the guide shoe 111 and on a side face 137 that may come into sliding contact with the guide shoe 111 in the width direction. The lubricant regions 145 on outer side faces of the outer link plates 135 are provided in regions that may come into sliding contact with side faces 117 of guide walls 116 facing the chain-running surface 113.

Figure 6:
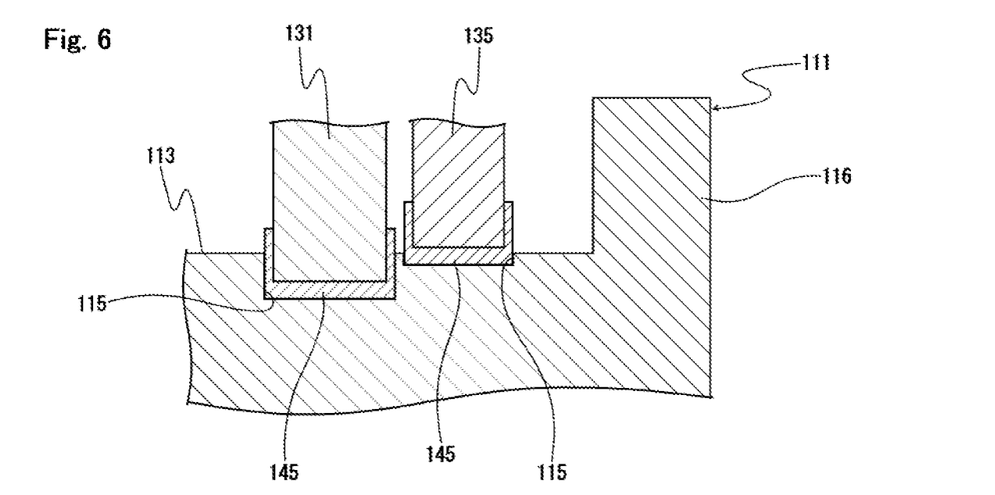
FIG. 6 is a schematic cross-sectional view illustrating a state of contact between the chain and the guide shoe of the fixed guide when the guide shoe has worn.

The lubricant regions 145 also provided on the side faces 133 of the inner link plates 131 and on the side faces 137 of the outer link plates 135 can effectively prevent an increase in sliding resistance even if new wall surfaces 115 are unwantedly formed that may make sliding contact with either the inner link plates 131 or outer link plates 135 in the width direction as a result of wear on the guide shoe 111 because of the chain 130 sliding thereon, as illustrated in FIG. 6.

Figure 7:
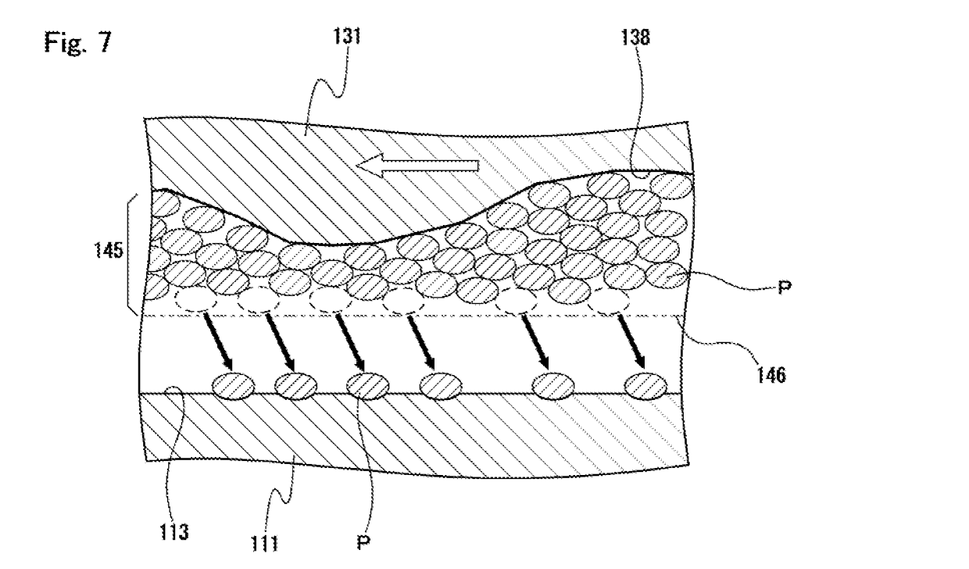
FIG. 7 is a schematic diagram illustrating a phenomenon in which solid lubricant transfers to the guide shoe by the sliding movement of the chain plates and guide shoe.

The lubricant region 145 is formed by solid lubricant P in particulate form adhered to the chain plate as illustrated in FIG. 7. For ease of understanding, FIG. 7 illustrates the chain-running surface 113 and the surface 146 of the lubricant region 145 of the inner link plate 131 spaced from each other. It should be noted that the extremely large illustrated particle size of the solid lubricant P does not indicate the actual size.

Materials for the solid lubricant P are not limited particularly, as long as the lubricant can form a tribofilm by adsorbing or reacting with an additive component contained in the lubricating oil. Examples include metals such as copper and aluminum, and alloys thereof, and metal oxides such as alumina.

The lubricant region 145 may be formed by shot peening or shot blast, for example, using the solid lubricant P as the shot material. Preferably, solid lubricant P having a particle size in a range of, for example, from 1 to 200 μm, should be used. Such methods of applying the solid lubricant P on the chain plates allow the solid lubricant P to firmly adhere to the chain plates by mechanical engagement with irregular surfaces so that the solid lubricant P can be transferred from the surface of the lubricant region 145 onto the chain-running surface 113 of the pivoting lever guide 105 and the chain-running surface of the fixed guide 110 by the sliding movement of the chain plates and guide shoe 111. Moreover, since the solid lubricant P collides the chain plates in solid state, the solid lubricant P does not undergo alteration and can exhibit its original properties.

Figure 8:
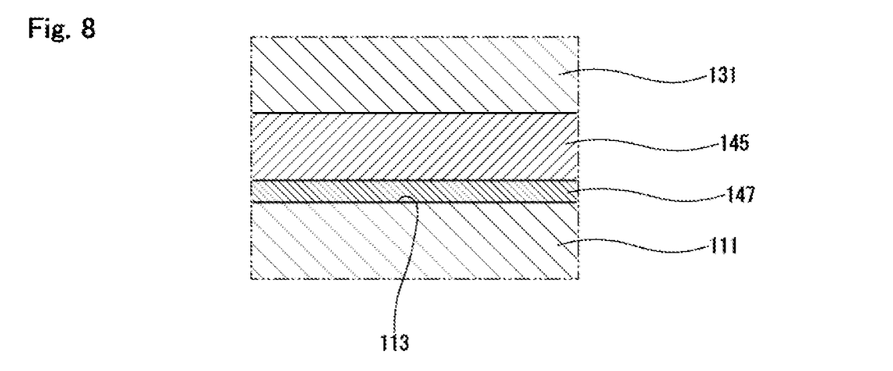
FIG. 8 is a schematic cross-sectional view of a region encircled with a two-dot chain line in FIG. 5, illustrating a state of the chain-running surface when the chain runs.

According to the chain drive system 100 of this embodiment, the sliding movement of the chain 130 and guide shoe 111 causes the solid lubricant P to come off of the surface of the lubricant regions 145 of the chain plates, which is then retained on the chain-running surface 113 of the guide shoe 111 made of synthetic resin as if embedded therein. Therefore, the solid lubricant is not removed by the lubricating oil supplied between the chain 130 and the guide shoe 111 so that a condition that accelerates formation of a tribofilm 147 from the additive components of the lubricating oil as illustrated in FIG. 8 is achieved, and thus lubrication effects by the solid lubricant itself, as well as by the tribofilm 147, are achieved in the regions of the guide shoe 111 that make sliding contact with the chain.

Moreover, minute irregularities 138 present on the surface of the chain plates allow the solid lubricant P to adhere to and be retained on the surface irregularities 138 of the chain plates, which enables constant supply of the solid lubricant P to the chain-running surface 113. Similar lubrication effects are achieved on the chain-running surface of the pivoting lever guide 105.

Accordingly, the chain drive system 100 of this embodiment can reduce the sliding resistance between the chain 130 and the guide shoes 106 and 111 largely, suppress an increase, over time, in sliding resistance, and reduce wear on the guide shoes 106 and 111.

While the configuration in the embodiment described above assumes that all the chain plates have the lubricant region 145, it suffices if at least one of the plurality of chain plates has the lubricant region 145. The lubricant region 145 need not necessarily be provided to a side face of the chain plate. It suffices if the chain plate has the lubricant region at least on a surface that makes sliding contact with the chain-running surface.

Figure 9:
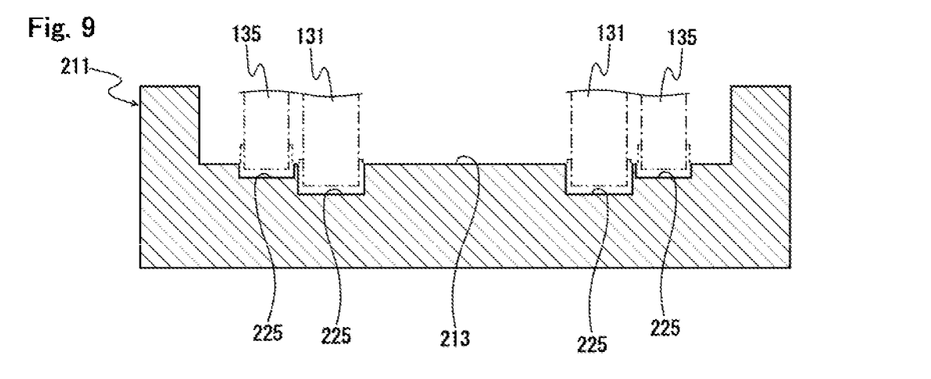
FIG. 9 is a schematic cross-sectional view illustrating a configuration of a guide shoe of a fixed guide according to another embodiment of the present invention.

Moreover, as illustrated in FIG. 9, the guide shoe 211 may be configured to include plate guide grooves 225 in the chain-running surface 213 such as to extend along the chain-running direction. In this embodiment, the plate guide grooves 225 are configured to guide the inner link plates 131 and outer link plates 135. The plate guide grooves are not limited to this specific form and may be formed, for example, such as to guide only the inner link plates 131. According to this embodiment, the solid lubricant P can be transferred not only to the bottom surfaces of the plate guide grooves 225 that come into sliding contact with the chain plates but also to both side faces of the plate guide grooves 225 that contact the chain plates in the width direction by the sliding movement of the chain 130 and guide shoe 211. Therefore, the chain 130 made of metal and the guide shoe 211 made of synthetic resin can avoid making direct sliding contact with each other, so that an increase in sliding resistance can be effectively prevented.

While the embodiment described above assumes that the chain drive system is used in a timing system of an internal combustion engine such as a car, the application is not limited to this and the system is applicable to various apparatuses.

Also, while the system is designed as a chain drive system, it is applicable to other similar drive systems that use belts or ropes as long as the materials and sliding contact conditions are similar, i.e., the system is applicable in various industrial fields.

What is claimed is:
1. A chain drive system comprising:
a chain including a plurality of chain plates;
a plurality of sprockets on which the chain is wound; and
one or more guides slidably guiding, in presence of lubricating oil, the chain,
each of the one or more guides including, integrally or separately, a guide shoe having a chain-running surface, wherein
at least one of the plurality of chain plates has a lubricant region retaining a solid lubricant in particulate form,
the solid lubricant is configured to come off the lubricant region to lubricate the guide shoe of each of the one or more guides so that a tribofilm effect is obtained between the plurality of chain plates and the guide shoe,
the lubricant region is formed by adhering thereto the solid lubricant that is in particulate form,
the solid lubricant is held in particulate form by mechanical engagement so that it can be transferred to the chain-running surface by a sliding movement of the chain plates and the guide shoe, and
the lubricant region is formed by shot peening or shot blast using the solid lubricant as a shot material.
2. The chain drive system according to claim 1, wherein the solid lubricant is made of metal or metal oxide.

3. The chain drive system according to claim 1, wherein the lubricant region is provided to an end face of each chain plate that makes sliding contact with the chain-running surface.

4. The chain drive system according to claim 1, wherein the guide shoe has a wall surface configured to contact some of the plurality of chain plates in a width direction, and the lubricant region is provided to a side face of each chain plate that makes sliding contact with the wall surface.

5. The chain drive system according to claim 4, wherein the wall surface includes a surface on a chain-running surface side of a guide wall provided to an end portion in the width direction of the chain-running surface.

6. The chain drive system according to claim 4, wherein the wall surface includes both side faces of a groove formed in the chain-running surface.

\* \* \* \* \*